Nov. 7, 1950     A. L. PRESTON     2,528,780
APPARATUS FOR DISPENSING LIQUEFIED GASES

Filed Jan. 31, 1946     3 Sheets-Sheet 1

INVENTOR
ALBERT L. PRESTON
BY
ATTORNEY

Nov. 7, 1950     A. L. PRESTON     2,528,780
APPARATUS FOR DISPENSING LIQUEFIED GASES
Filed Jan. 31, 1946     3 Sheets—Sheet 3
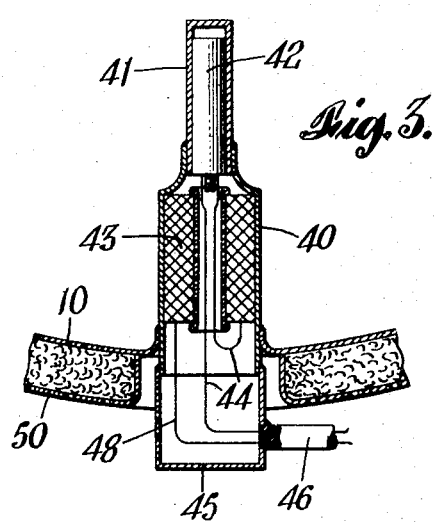
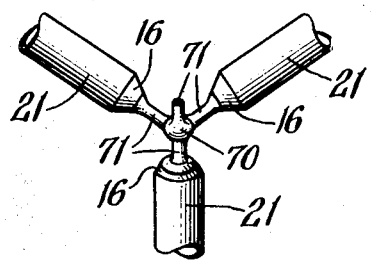
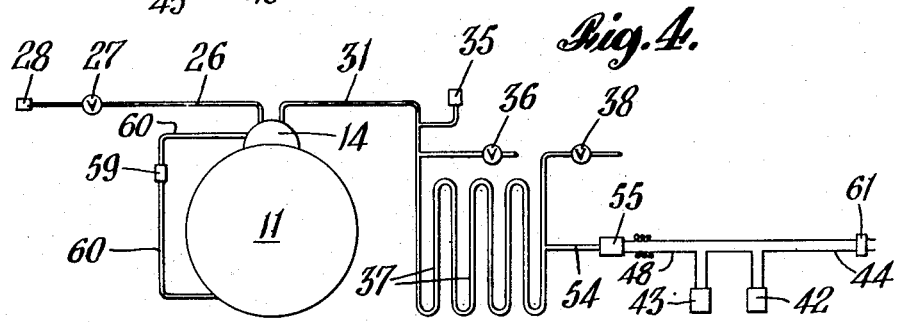
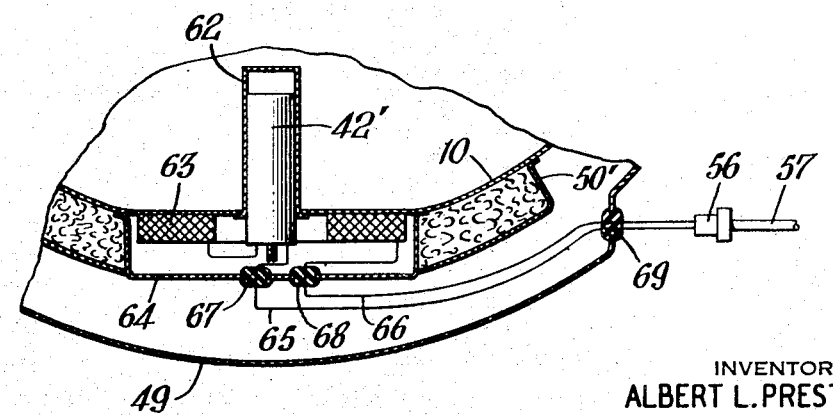
INVENTOR
ALBERT L. PRESTON
BY
ATTORNEY Patented Nov. 7, 1950

2,528,780

UNITED STATES PATENT OFFICE 2,528,780

APPARATUS FOR DISPENSING LIQUEFIED GASES

Albert L. Preston, Kenmore, N. Y., assignor to The Linde Air Products Company, a corporation of Ohio Application January 31, 1946, Serial No. 644,606

10 Claims. (Cl. 62—1)

This invention relates to an apparatus for holding and vaporizing liquefied gases, and more particularly to apparatus for carrying liquid oxygen in aircraft and supplying gaseous oxygen under a desired pressure to a distributing system or consuming device.

An apparatus for supplying gaseous oxygen to an oxygen supply system or to breathing apparatus as heretofore used consisted of one or more heavy cylinders containing oxygen compressed to high pressure and connected to the breathing apparatus by pressure reducing devices. Such cylinders have the disadvantage of providing a limited supply of gas for a given weight of storage cylinders, or excessively heavy cylinders are required for a desired supply of gas. It has been proposed to provide a supply of oxygen in the liquid state held in a vessel at moderate super-atmospheric pressure, which vessel is insulated to prevent atmospheric heat from vaporizing the liquid during periods when no gas is needed. Such devices are generally provided with heating means to generate gaseous oxygen when and as required. The vessels heretofore proposed were of the vacuum insulated type having an upwardly extending neck, the neck being used for supporting the inner vessel within the insulating casing and for insertion of the heating element. In such an apparatus, which is often termed a cold converter, considerable heat leakage occurs through the neck, which must be made long to reduce such heat leakage. Space requirements in aircraft are quite limited and the use of a long neck is either impossible or would excessively reduce the capacity of the converter. Not only does the short neck cause excessive heat leak, but the neck type of construction inherently involves considerable weight.

For an aircraft cold converter certain additional requirements must be met, i. e., the apparatus must be constructed so that it can be held in any of the various positions and be operable to supply gas for adequate periods even when inverted. The heat leak must not unduly increase when the container is on its side or when it is inverted. The inner vessel must be adequately supported in spaced relation to the vacuum casing in any position and the supporting means must resist the forces of acceleration in any direction. At the same time, the supporting means should transfer as little atmospheric heat to the inner vessel as possible. The apparatus should be light in weight, require a minimum of head room, and be simple and safe to operate.

A principal object of the invention is to provide an improved cold converter for holding and vaporizing liquefied gas and to deliver gas in quantity as and when required at a pre-determined pressure, which apparatus shall be compact and light in weight in proportion to the quantity of liquefied gas it will hold.

Further objects of the invention are to provide such an apparatus which may be held in any position while it continues to preserve the liquefied gas without excessive vaporization and which vaporizes liquid for producing gas at a rate required for use; to provide such a portable cold converter which will vaporize liquid and deliver gas at a rate no greater than the rate required for use even when inverted; to provide a cold converter of the vacuum insulated type which avoids the use of a neck construction; to provide a cold converter without a neck in which the inner vessel is adequately supported in any position of the cold converter by a load rod arrangement that keeps the heat leak therethrough at a minimum; to provide a load rod arrangement for supporting the inner vessel of a cold converter equally in any position with a minimum number of load rods; to provide an aircraft cold converter which has low heat leak, low dead weight, low over-all height commensurate with its liquid holding capacity, combined in a construction that adequately resists all forces applied to the parts by an airplane during flight; to provide a liquid vaporizing arrangement in such a converter which avoids the use of a neck and eliminates the heat leak due to a vaporizer supporting tube extending through a neck; and to provide such a cold converter construction in which the inner vessel is supported only by load rods and the vacuum casing is supported independently of the inner vessel so that it can be lighter than if it were used to also support the inner vessel.

These and other objects of the invention will in part be obvious and in part become apparent upon consideration of the following description in connection with the accompanying drawings, in which:

Fig. 3 is a longitudinal, sectional view on an enlarged scale of the vaporizer employed in the cold converter of Figs. 1 and 2;

Fig. 4 is a simplified diagram to illustrate the gas flow and electrical connections;

Fig. 5 is a sectional view illustrating an alternative arrangement of vaporizing means; and Fig. 6 is a fragmentary view of a connection cluster which may be employed at the inner ends of the load rods.

Figure 1:
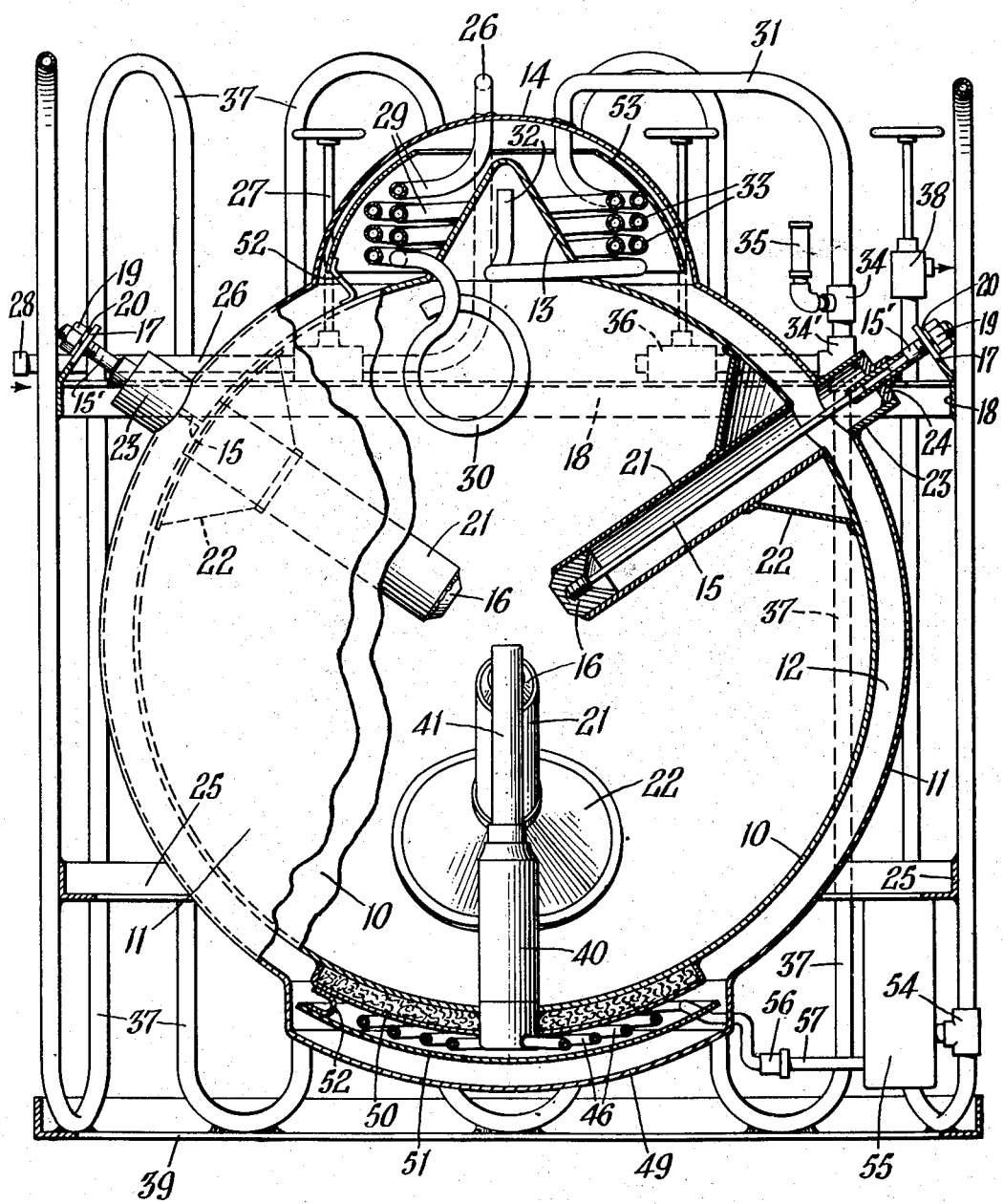
Fig. 1 is a view, mainly in vertical cross-section, of an exemplary cold converter construction embodying the invention.
Figure 2:
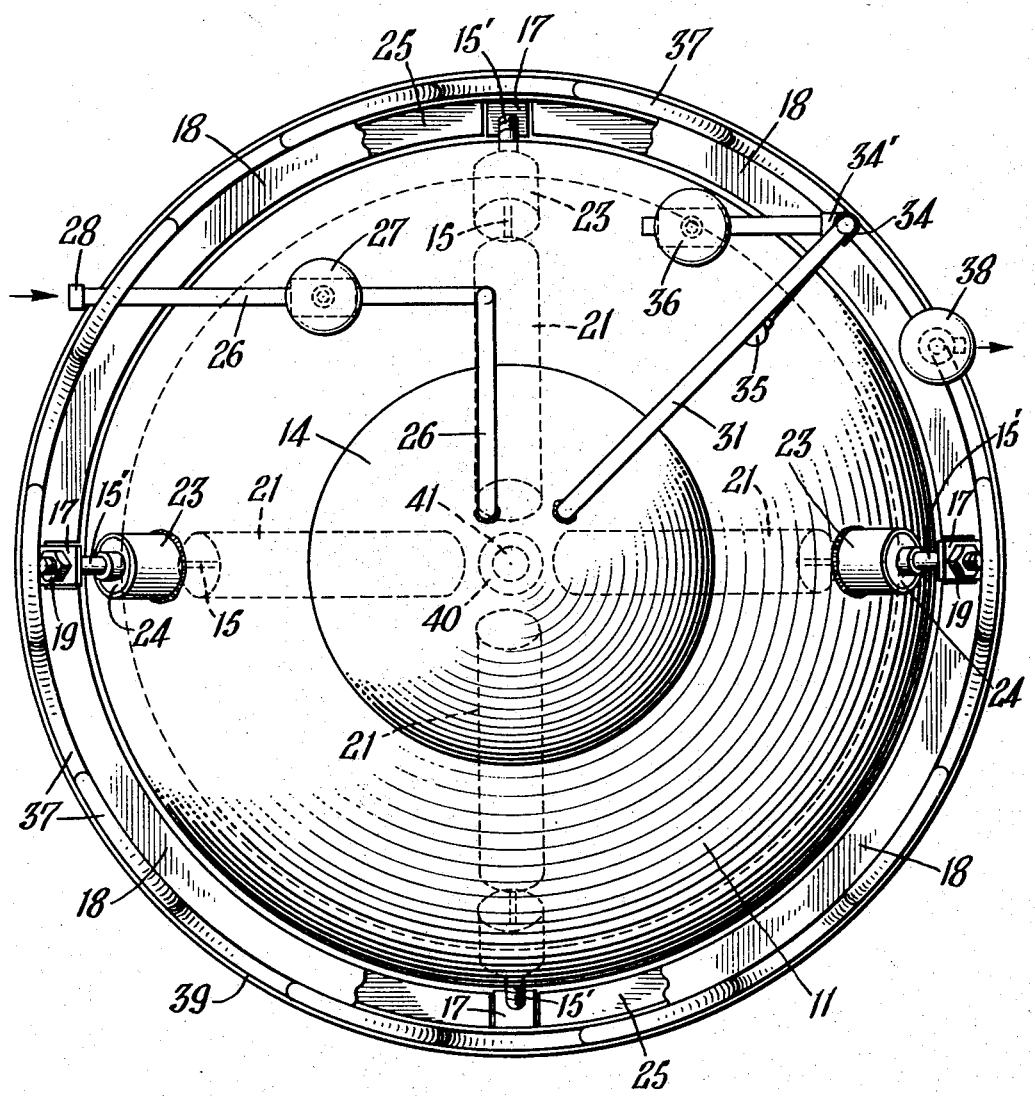
Fig. 2 is a plan view of the cold converter shown in Fig. 1.

Referring now to the drawings, particularly to Figs. 1 and 2, the cold converter includes a liquid holding inner vessel 10 which is preferably spherical in form since this shape provides the largest volume for a given weight of metal. The inner vessel 10 is completely surrounded by a heat insulating means or jacket having a casing 11 which is spaced from the inner vessel to provide an insulating space 12. Such heating space 12 may be filled with a suitable heat insulating material, but the lightest weight insulation is provided by evacuating the space 12 to a high degree and providing a high polish on the outer surface of the inner vessel and on the inner surface of the casing 11. Instead of an upwardly extending neck, the inner vessel is provided with a relatively small dome-like projection 13 which may be conical, and the casing 11 also has a considerably larger dome 14 to enclose the dome 13, and conduit coils to be described later.

The inner vessel is supported by a load member arrangement that preferably employs only four load members, one of which is shown in section in Fig. 1. It preferably comprises a thin elongated rod 15 which is secured at its inner end to a plug or block 16 which is located within the inner vessel. The load rod 15 extends radially outward through the walls of the inner vessel and casing to an anchorage comprising a threaded member 15' secured to a supporting bracket 17 which is mounted on or is part of an external supporting frame ring member 18. The outer end of the member 15' is secured to the bracket 17 by an adjusting nut 19 which can be turned to adjust the tension in the rod 15. The nut 19 may be locked in position by suitable means such as a lock washer 20. The block 16 is secured gastightly to the inner end of a tubular rod housing 21 which is gastightly secured at its outer end to the wall of the inner vessel 10. The rod is thus out of direct contact with the wall 10 and to increase the effectiveness of insulation, the rod and the inside surface of the housing 21 are polished. A conical bracket 22 may be provided between the housing 21 and the wall of the inner vessel 10 to reinforce the wall. To support and to seal the casing 11 there is provided an outwardly extending short tubular extension or housing 23 around the outer portion of the rod 15. The inner end of the housing 23 is gastightly secured to the casing 11 and its outer end is sealed by a cap 24 which is secured and sealed to the anchorage member 15'. Thus the casing 11 is directly supported by the bracket 17 substantially independently of the support for the inner vessel. The casing is thus stressed only to the extent of supporting its own weight and thus can be made of thin metal.

Although any number of load member supports can be used, as previously mentioned, four such supports are preferably employed, the other three being similar to the one above described. The load members are so distributed that the angles between them are equal within manufacturing allowances (approximately 109°, 28 minutes), and for a spherical vessel, the arrangement is such that the axes of the four load rods are related to each other as four lines radiating from the center of gravity of a regular tetrahedron, each passing through one of the four points or corners of such tetrahedron. Since support is provided in any direction, the load member arrangement can have any desired orientation when the cold converter is upright. A preferable orientation is as shown in the drawing in which two of the load members extend upwardly and are secured to two brackets 17 on the upper frame ring member 18. The other two load rods extend downwardly and are secured to similar brackets 17 which are on a lower frame ring member 25. The orientation shown would also be advantageous for a vessel which is oval in shape and elongated vertically.

Means for filling liquid into the converter is provided in the form of a filling conduit 26 which has a stop valve 27 interposed therein, at the outer side of which is a coupling 28. The conduit 26 passes gastightly through the upper part of the outer dome 14 and is formed into a horizontal coil 29 surrounding the inner dome 13. From the coil portion 29 the conduit 26 passes gastightly through the dome 13 into the interior of the inner vessel wherein it is provided with a loop or coil portion 30 which is in a vertical plane. The combination of the coil portions 29 and 30 provides a universal liquid trap to prevent flow of liquid into the outer portion of the conduit 26 when the vessel is turned on its side or when it is inverted. A similar feature is disclosed and claimed in the co-pending United States application, Serial No. 587,656, filed April 11, 1945, which issued as Patent No. 2,502,588, April 4, 1950, by A. L. Preston and G. H. Zenner.

Gas is discharged from the inner vessel through a discharge conduit 31 which has an open inner end 32 located near the upper part of the inner dome 13. From the end 32 the conduit runs downward and then passes gas-tightly through the wall of the inner vessel to a coil portion 33 which is also formed around the inner dome 13 and within the upper dome 14. From the coil 33 the conduit 31 passes gas-tightly through the upper part of the dome 14 and then to a T connection 34. The combination of the vertical portion 32 and the horizontal coil portion 33 forms a universal liquid trap for the gas discharge conduit 31. The side branch of the T 34 is connected to a safety relief valve 35 which is set to release gas if an excessive pressure is developed in the inner vessel. The run of the T 34 is coupled to another T 34', the side branch of which connects to a blow-off or vent valve 36. The run of T 34' is connected to one end of a superheater passage in the form of a conduit 37 which is preferably constructed to form part of the external supporting frame of the converter. The end 32 of conduit 31 is positioned centrally near the top of the dome 13 and the height of the dome and position of end 32 is proportioned to the width of the opening into the dome 13 from the vessel 10 so that the cold converter can be tilted at least 45° and preferably to about 60° from the vertical before liquid at the normally full lever will enter the opening 32.

The conduit 37 is formed in vertical serpentine loops disposed completely around the casing 11 and the outlet end of the conduit 37 is provided with a discharge valve 38. The ring members 18 and 25 are welded to the vertical portions of the conduit 37 and there is preferably provided a floor ring 39 which is welded to the lower loops of the conduit 37. The superheater 37 is thus of the type which absorbs its heat from the atmosphere. In some cases it will be preferable to provide an electrically heated superheater, in which case other means such as a cylindrical shell could be used to support the ring members 18 and 25. A combined superheater and frame of the type herein employed is disclosed and claimed in my copending application, Serial No. 642,820, filed January 23, 1946, which issued as Patent No. 2,515,836, July 18, 1950.

The means for vaporizing the liquid as required for use is preferably inserted from the bottom and may comprise a vaporizer chamber casing 40 which is gastightly secured to the bottom of the inner vessel and extends upwardly therein. (See Figs. 1 and 3.) An upper reduced portion 41 of the casing 40 houses a thermo-switch 42 of a type which is commercially available and which includes a thermostatic element that controls an electric switch. The thermo-switch is adjusted so that it opens the switch whenever the temperature rises substantially above the temperature of the liquefied gases. In the larger part of the vaporizer chamber 40 there is a heater element 43 which preferably is provided with an axial opening therethrough for the passage of wires 44 of the thermo-switch 42. The heater element may be of customary construction, for example, a resistance element supported by a ceramic spool. The outer end of the casing 40 is closed by a cap 45 to which is secured a wire enclosing conduit 46. One of the wires 44 is joined to a terminal of the heater element. The other wire 44 passes together with a wire 48 from the other terminal of the heater element 43 through the wire conduit 46. The conduit 46 is preferably elongated by forming it into a coil within the insulating space 12, after which it passes gastightly through the jacket 11, preferably at a downwardly extended portion 49 at the bottom of the casing 11. The dished out or extended portion 49 is provided to enclose the conduit 46 and the customary blister or perforated container 50, which is customarily provided to hold a gas-absorbing material in contact with the wall of the inner vessel to assist in preserving the high degree of vacuum in the insulating space 12. Since the thermo-switch and heater element operate better when not enclosed in a vacuum and to avoid possible emission of gases from the heater into the insulating space 12, the heater chamber is preferably gas-tightly sealed from the insulating space. The gaseous atmosphere in the heater chamber should be chosen so that there will be no condensation at the temperature of the liquefied gas in the inner vessel. Thus when liquid oxygen is held in vessel 10 the gas in the vaporizer chamber 40 could be dry air or preferably dry nitrogen. Helium may also be used and provide the slight advantage of improved heat transfer.

In order to reduce the heat exchange by radiation, a highly polished thermal shield 51 may be provided between the extended portion 49 and the conduit 46 and annular blister 50. The shield 51 is preferably supported from the blister by several short, thin brackets 52. A similar thermal shield 53 is provided at the upper end of the cold converter within the dome 14 and about the conduit coils 29 and 33. Interposed in the conduit 37 is a T connection 54, to the side branch of which is coupled a pressure switch 55. This pressure switch may be of a commercial type which for example has a pressure responsive element that controls the opening and closing of switch contacts. The conduit 46 ends in a coupling 56 which is connected to the end of an electrical conduit 57 extending from the pressure switch 55.

The flow diagram of Fig. 4 illustrates the external gas conduit arrangement more clearly. Features indicated in Fig. 4 and not shown in Figs. 1 and 2 in the interests of clearness of the drawing are: a liquid level indicating gauge 59 which is connected by small conduits to the upper and lower portions of the inner vessel 10 and an electric supply connecting plug 61. In Fig. 4 the electrical connections between the pressure switch 55, the heater element 43, and the thermo-switch 42 are also shown. These are all connected in series with plug 61 which is employed to couple the circuit to a source of electric energy.

Referring now to Fig. 5, an alternative form of heating means is shown. In this arrangement a small housing 62 extending upward into the inner vessel houses the thermo-switch 42'. The heater element 63 is made in ring form and secured externally against the bottom of the vessel 10. A cover 64 is secured gastightly to the inner vessel 10 for completely enclosing the heater element 63 and the lower end of the thermo-switch 42'. The lead wires may be brought out through a conduit similar to conduit 46 as described in Fig. 3. Alternatively, as shown in Fig. 5, the lead wires 65 and 66 pass through insulating seals 67 and 68 in the wall of the cover 64. The blister 50' may be of annular form and arranged around the cover 64. The lead wires 65 and 66 pass through the extended portion 49 of the outer casing, also through an insulating seal 69, after which the wires connect to the coupling 56.

In order to reduce the strain on the wall of the inner vessel 10 so that such wall can be made of thinner metal, it may be desirable to join the blocks 16 by suitable means such as the connecting cluster illustrated in Fig. 6. The cluster includes a center-block or ball 70 having four arms 71 radiating therefrom. The arms 71 are joined at their outer ends to the block 16. In this way the entire weight of the inner vessel need not be suspended upon a single load rod 15 when the converter is held in such a position that a load rod 15 extends vertically upward. With the cluster of Fig. 6 the load would be distributed among all of the load rods. The load rods can therefore be made thinner and consequently their heat leak would be lower. Also the use of reinforcing cones 22 may be unnecessary.

The cold converter may be permanently mounted in an aircraft or vehicle and charged thereon or it may be charged at a suitable station and then mounted aboard the craft when needed. When the converter is to be charged, the vent valve 36 is open, the coupling 28 is connected to a source of liquid oxygen and the valve 27 opened. Due to a difference of pressure, liquid oxygen flows into the vessel and displaced gas flows out through the conduit 31 and vent 33. On the first filling some liquid vaporizes due to cooling the parts of the inner vessel. The vessel is filled to a level which provides a vapor space above the liquid. This vapor space is chosen at atmospheric pressure so that there will still be a vapor space when the liquid is heated to its boiling point corresponding to the working pressure which may be any desired pressure above atmospheric, for example, 65 p. s. i. gauge. The amount of liquid can be determined in various way, for example, by noting the reading of the liquid level gauge, by the use of a trycock, by using a meter, or by weighing the converter.

When the vessel is charged all valves are closed and if gas is not needed at once, the converter pressure will rise only very slowly due to the heat leak at a low rate through the insulation and load rods. When gas is needed the plug 61 is connected to the electric current supply and the heater 43 will be energized to vaporize liquid. The circuit is closed because the thermo-switch 42 is at the liquid temperature which holds its contacts closed. The pressure switch 55 holds its contacts closed until the desired working pressure develops in the vessel 10 which is in pressure communication through conduit 31 and superheater 37. When working pressure is reached the pressure switch de-energizes the heater 43. The consuming apparatus is connected to the discharge of the valve 38 which is opened as required. The vapor flows through conduit 31 and the superheater 37 warms it to the desired temperature which is about atmospheric temperature. If the pressure falls below the set working pressure the pressure switch energizes the heater. When the liquid is substantially consumed, the thermo-switch will warm up due to the thermal path between it and the heater element. This will break the circuit so that the heater will not operate unless liquid is present.

The converter operates normally as described above when upright and when tilted at angles up to about 60° from the vertical. When the converter is on its side or when upside down, the universal traps in the filling and discharge lines function to prevent loss of liquid and excessive vaporization.

Since valve 27 is closed, the filling line 26 is dead ended and gas pressure therein will prevent liquid from flowing over the high parts of the trap loops 29 and 30. Similarly liquid will not flow over the high parts of the traps constituted by the inner end of line 31 and coil 33 unless gas is released at the valve 38 and if gas is used, the amount of liquid that passes into the line 31 will correspond only to the gas consumed. Such liquid will be vaporized as it passes through the exposed part of line 31 and in the superheater 37 and, as liquid phase withdrawal reduces the pressure either not at all, or only slowly, the heater usually need not operate.

It will be seen that the inner vessel supporting arrangement according to the invention permits the elimination of a neck construction with its space requirement, excessive heat leak, and weight; that the inner vessel is adequately supported in any direction by a minimum number of load rods which can be long so that heat conduction therethrough is low; and that the converter is operable in any position, is compact, and has a large liquid holding capacity for its size and weight.

The invention is not limited to the exact details of construction disclosed herein and it will be now apparent to those skilled in the art that certain features of the invention may be used independently of others and that changes may be made in various features without departing from the principles of the invention. For example, instead of solid rods one or all of the load members 15 can be tubular, and if tubular, such load members could be employed as gas and liquid conduits to replace the charging and vapor lines provided that suitable trapping means were also used. It is also contemplated that the liquid charging line 26 could be arranged to have its inner end at or near the bottom of the inner vessel so that it could be used to take out liquid if necessary.

I claim:

1. A gas dispensing apparatus comprising in combination an inner vessel for holding a body of liquefied gas surrounded by a heat insulating jacket; an external supporting frame for said apparatus including superheater passage means and at least four load member anchorages; means for supporting said inner vessel within said jacket comprising at least four elongated load members secured at their outer ends to said anchorages, passing through said jacket and having their inner ends within said vessel secured to re-entrant portions of the wall of said inner vessel, said load members being substantially equally spaced to support the inner vessel in any position of the apparatus and constituting the sole supporting means for said inner vessel; heater means at a low portion of the inner vessel wall and provided with means for supplying heating energy extending therefrom through said jacket; a dome-like extension at the upper part of said inner vessel surrounded by a dome-like portion of said jacket; a liquid filling line extending gas-tightly through said jacket and the inner vessel wall from a filling connection to a point within the inner vessel; a gas discharge line extending from a point within said dome-like extension gas-tightly across said insulating jacket to an external connection, both said lines having universal liquid trapping means interposed therein; and means connecting said gas discharge line to the inlet of said superheater passage means.

2. In a cold converter having a liquefied gas holding inner vessel surrounded by an insulating jacket; a supporting structure comprising a frame about said jacket; and inner vessel supporting means comprising four elongated load members extending outwardly in different directions from points within said inner vessel, said load members being related to each other as lines radiating from the center of gravity of a regular tetrahedron and each passing through one of the four corners of such tetrahedron, reentrant portions formed in the wall of said inner vessel about said load members, said load members being secured at their inner ends to the inner ends of said reentrant portions, and anchorages on said supporting frame to which the outer ends of said load members are secured, two of such anchorages being at an upper level and the other two being at a lower lever, said supporting structure holding the inner vessel with substantially equal support in any direction.

3. In a cold converter having a liquefied gas holding inner vessel surrounded by an insulating jacket, supporting means comprising at least four elongated load members extending outward in different directions from within said inner vessel, load supporting means disposed externally of said jacket, reentrant portions formed in the wall of the inner vessel about said load members, means for securing together the inner ends of said reentrant portions, said load members being secured to said load supporting means at their outer ends and secured at their inner ends to the inner ends of said reentrant portions, and said load members being spaced to provide support in any position of the converter.

4. In a cold converter having a liquefied gas holding inner vessel surrounded by an insulating jacket, inner vessel supporting means comprising at least four elongated load members extending outward in different directions from within said inner vessel, said load members being arranged so that the angles between adjacent members are substantially equal, said load members being secured at their inner ends to plugs; tubular housings around said load members extending from said plugs to the wall of said inner vessel, said housings being secured gastightly respectively to the plugs and the wall of the inner vessel; a supporting frame having anchorages externally of said jacket; means for securing said load members to said anchorages; and means for independently supporting said jacket on said anchorages.

5. In a cold converter having a liquefied gas holding inner vessel surrounded by and supported within an insulating jacket, a dome-like projection at the upper part of said inner vessel, and a gas discharge line having a portion with an end opening located within said projection, which portion extends downwardly in said projection and then out through the inner vessel wall and said insulating jacket, said discharge line end opening being located near the upper middle part of said projection, and said projection being proportioned as to height and base diameter so that the converter may be tilted up to at least 45° from the vertical without the normally full liquid level reaching said opening.

6. In a cold converter having a liquefied gas holding inner vessel surrounded by and supported within an insulating jacket, a dome-like projection at the upper part of said inner vessel, and a gas discharge line having a portion with an end opening located within said projection, which portion extends downwardly in said projection and then out through the inner vessel wall and said insulating jacket, said discharge line having a portion horizontally coiled around said projection, said insulating jacket having an outer shell with a dome covering said projection and said coiled portion, and a polished thermal shield disposed between said coil portion and said jacket dome.

7. In a cold converter having a liquefied gas holding inner vessel surrounded by and supported within an insulating jacket and a gas discharge line extending from a point within and near the upper part of said inner vessel, a heater means at a low part of said inner vessel, said heater means comprising a heater element disposed within a chamber extending into the inner vessel from the bottom thereof, said chamber being defined by walls secured to the bottom of said inner vessel, and conduit means for supplying heating energy to said heater means extending from said chamber, adjacent the bottom of said inner vessel, and gastightly through said jacket.

8. In a cold converter having a liquefied gas holding inner vessel surrounded by and supported within an insulating jacket and a gas discharge line extending from a point within and near the upper part of said inner vessel; a heater means at a low part of said inner vessel, said heater means comprising a heating element mounted in heat trasferring relation to the external bottom surface of said inner vessel and being supported by the bottom of said inner vessel, and means for supplying heating energy to said heater means exending from said heater, adjacent the bottom of said inner vessel, and gastightly through said jacket.

9. In a cold converter having a liquefied gas holding inner vessel surrounded by and supported within an insulating jacket and a gas discharge line extending from a point within and near the upper part of said inner vessel; a heater means at a low part of said inner vessel comprising a housing extending upward from the bottom of said inner vessel, an electric heater element within a portion of said housing, a thermoswitch located in another portion of said housing and electrically connected to control said heater element, said thermoswitch being in heat conduction relation to said heater element and to the liquefied gas through the wall of said housing, means for maintaining a positive gas pressure within said housing, and conduit means for conducting electric energy to said heater element through a wall portion of said jacket.

10. In a cold converter having a liquefied gas holding inner vessel surrounded by and supported within an insulating jacket and a gas discharge line extending from a point within and near the upper part of said inner vessel; a heater means at a low part of said inner vessel comprising an annular electric heater element in heating relation to the bottom of said inner vessel, a housing extending into said inner vessel and having a lower open end gastightly secured in the wall of said inner vessel, a thermoswitch mounted in said housing and connected to control said heater element, means for maintaining a gas pressure within said housing, and means for conducting electric power to said heater element through a wall portion of said jacket.

ALBERT L. PRESTON.

REFERENCES CITED

The following references are of record in the file of this patent:

UNITED STATES PATENTS

| Number | Name | Date |
| --- | --- | --- |
| 1,522,886 | Heylandt | June 13, 1925 |
| 1,863,958 | Wulff et al. | June 21, 1932 |
| 2,256,673 | Hansen | Sept. 23, 1941 |
| 2,256,679 | Kornemann et al. | Sept. 23, 1941 |
| 2,385,984 | Hansen | Oct. 2, 1945 |